United States Patent Office

3,379,799
Patented Apr. 23, 1968

3,379,799
METHOD OF MAKING FOAMED PLASTICS
Conrad Goldman, Rochester, N.Y., assignor to Papex Corporation, Rochester, N.Y., a corporation of Delaware
No Drawing. Continuation-in-part of application Ser. No. 323,045, Nov. 12, 1963. This application Oct. 20, 1965, Ser. No. 499,096
2 Claims. (Cl. 264—26)

ABSTRACT OF THE DISCLOSURE

A foamed plastic is produced by providing a mass of particles, each of which has a core portion comprising a gelied non-polar blowing agent capable of forming a gas when heated, and a thermoplastic resin shell portion enveloping the core portion, the shell portion being more responsive to RF heat than the core portion. RF heat is applied to the particles to soften the shell portions sufficiently so they can expand without rupturing; then while the shell portions are at this softness, non-RF heat is applied to the particles to volatilize the blowing agent to expand the particles.

---

This invention is a continuation in part of patent application Ser. No. 323,045, filed Nov. 12, 1963.

The present application relates in general to the field of foamed plastics, and more particularly to novel foamable plastic compositions and a novel method for fusing and expanding foamable polymers through the use of radio frequency heating.

The use of radio frequency heating (abbreviated as RF heating) for heat sealing polar thermoplastics is well known in the plastics field. RF heating has been successfully used to expand foamable polystyrene beads which have been specially treated to provide a degree of polarity to the surface of the beads. In the co-pending patent application, Ser. No. 323,045, filed Nov. 12, 1963, means have been described whereby the outer shell of a double shelled foamable plastic particle is preferentially heated by RF heat, to fuse the outer shell, without unduly heating the inner shell and causing bursting of the bubbles.

With commercially available expandable thermoplastics, utilizing volatile liquids as blowing agents, it is essential to control heating techniques to attain desirable low density material, in making thin gauge material by the blown film process. Other materials, produced by other techniques, also require balanced control of heating techniques for best quality products. By the nature of the chemical and physical properties of the commercially available expandable thermoplastics, a balance between the strength of the fused polymer, during expansion, and the vapor pressure of the volatile liquid contained therein, in a more or less homogeneous distribution, during expansion, results in a predetermined degree of expansion, controllable only by the amount of thermal energy transferred to the expanding mass. The thermal energy, during blown film production of expanded polystyrenes, is derived from a combination of frictional heat and heat provided by the extrusion equipment. In steam molding of pre-expanded polystyrene beads, the thermal energy utilized in fusing the pre-expanded beads is derived from the steam. In RF heating of specially coated expandable polystyrene beads, the RF energy induces heat in the polar material applied to the outer surface of the pre-expanded beads, which in turn, by conduction, heats the remainder of the bead and produces secondary fusion and expansion.

The use of RF heat, to preferentially heat the outer shell of the double shelled expanded particles described above, is highly useful for fusing pre-expanded polymers; however, when used to expand and fuse polymers in a single operation, the use of pressure control is often desired, to prevent bursting of the thin walls, during expansion operations. Secondly, the heating of the inner shell and core, if non polar, is by necessity derived by conductive heating, from the outer shell, which has been heated by RF heat. Since RF heating is usually more expensive than other means of heating, the cost of heating expandable polymers for expansion and fusion purposes can be significantly reduced if only the polar material is heated by RF heat.

An object of the present invention is to provide optimum economy in heating an expandable polymer, by a combination of RF and non-RF heating techniques.

A further object of the invention is to control the hot melt strength of the polymer, and the vapor pressure of the volatile liquid blowing agent used to expand the polymer, independently, during fusion operations.

Another object of the invention is to minimize the pressure control requirements, to prevent bubble bursting of expanding polymer particles.

Briefly stated, and subject to the amplifications and qualifications further set out below, one aspect of the present invention comprises a two-step or two-stage heating procedure for expanding or foaming plastic particles having a core containing a volatile blowing agent and a shell or envelope surrounding the core. When the shell is non-polar and either the core material itself or the blowing agent in the core is polar, the first heating step is the application of non-RF heat to soften the shell so that it will expand rather than burst when the blowing agent is subsequently volatilized, and the second heating step is the application of RF heat, thereby to heat either the blowing agent itself (if polar) or the core material itself (if it is polar and the blowing agent is non-polar) so that the heat is transmitted to the blowing agent. In either case, this will volatilize the blowing agent in the core, expanding the enveloping shell but not rupturing the shell. When the shell is polar and both the core material and the blowing agent in the core are non-polar, the heating sequence is reversed, first applying RF heat to soften the shell, and then applying non-RF heat to volatilize the blowing agent. If both the shell and the core (or the blowing agent in the core) are polar, but to different degrees, combinations of the two kinds of heat may be used to provide the desired initial softening of the shell, followed by the volatilizing and blowing or expanding step. In any case, the use of the two kinds of heat, RF and non-RF, provides much better control of the operation than has heretofore been possible when using only a single kind, since the heating of the shell need be carried only to the point of securing the desired softness, and the volatilizing of the blowing agent in the core can be deferred until the shell is sufficiently soft to assure expansion without rupture. Moreover, the blowing agent (if polar, or if in a polar core) can be vaporized at a controlled rate in the second heating phase, thus eliminating or minimizing premature evaporation and possible loss of blowing agent and inefficient utilization of the blowing agent.

The term "polar" is here used in the same sense in which it is frequently employed in the art, to designate a material which absorbs and becomes heated by radiant energy in the RF or radio frequency part of the spectrum. The polar or non-polar characteristics of various materials, according to this definition (i.e., for purposes of the present invention), are not necessarily related to or consistent with other senses of the word polar as used in other connections in the fields of physics and chemistry. Various examples of materials which are respectively polar or non-polar, for purposes of the present invention, will be given below.

For instance, ethylene chloride, methylene chloride, and water are all readily heated by RF heat, and thus are described as polar for purposes of the present invention. They are suitable for use as the blowing agent within the core. Other examples of polar materials and non-polar materials will be given below.

With commercially available resins, the heat must be rapidly applied (such as by stream) to fuse a skin around the polymer beads prior to vaporization of the blowing agent, in order that expansion to low density can be achieved. The blowing agent, held by absorption within the porous bead, when heated slowly is lost to a significant degree, by vaporization, before the entire mass reaches the softening temperature, since the boiling point of the blowing agent is lower than the softening range of the resins.

With resins of the present invention, the boiling point of a polar blowing agent may be substantially higher than the softening point of the resin, and low density material may be readily produced by the novel two-heat system. By first softening the shell with non-RF heat, and then vaporizing the high boiling polar solvent with RF heat, expansion of the resin can be achieved with hitherto unobtainable flexibility and versatility of processing conditions. The range of formulations that can be processed by this system of non-RF and RF heating, is increased substantially since the number of solvents that are applicable as blowing agents is increased, because the restriction of choosing solvents which have a specified vapor pressure at temperatures corresponding to the softening range of the resin is no longer a limiting factor, as the combination of non-RF and RF heating enables the vapor pressure of a polar solvent and the softening range of the polymer to be independently controlled by the novel process. Examples of solvents useful in the two-heat system, in conjunction with polystyrene shells, include alcohols such as amyl alcohol and cyclohexanol, and selected ketones that in low concentrations only swell the resin, such as dissobutyl ketone and cyclohexanone. Various carbitols that are soluble in water may be incorporated with water-in-oil emulsifiers, as described further in the specification. With polar gelling agents in the core, nonpolar high boiling solvents may be utilized in a manner similar to that described with the lower boiling blowing agents. VM&P naphtha is an example of such a material. Liquids which boil above the softening point of polystyrene and which have intermediate polarities that are useful in the present invention, include turpentine, cyclohexanol, and similarly boiling liquids.

Specific examples of combinations of materials which are useful for the purposes of the present invention will now be given.

EXAMPLE 1

Core material is a gelled blowing agent, the gelling agent being a mixture of 3% aluminum isopropoxide and 97% oxidized polyethylene having a low molecular weight of about 1500, with a polar solvent such as methylene chloride as a blowing agent. The solvent may be from 70% to 30% of the total core material, the balance of 30% to 70% being the above described mixture of aluminum isopropoxide and polyethylene. Conveniently the polyethylene is the product "ACP 629" available on the commercial market from Allied Chemical Corp. This core is polar. The shell is polystyrene, which is non-polar. Heat first with non-RF heat to soften the shell.

When desired softness is achieved, apply RF heat to heat both the core material and the blowing agent contained therein, causing the core and shell to expand without rupturing the shell.

While the above percentages of aluminum isopropoxide and oxidized polyethylene in the core mixture are preferred the aluminum isopropoxide may be varied from about 1% to about 10%, the balance being ACP 629. Heptane or any of the aliphatic solvents in general may be used as the solvent and blowing agent instead of methylene chloride.

Here, as well as in the examples which follow, it is not necessary that the non-RF heat and the RF heat be mutually exclusive; they may be overlapped to some extent and the intensity or degree of each kind of heating may be varied as the cycle progresses.

In this and all other examples, percentages and proportions are by weight unless otherwise specified.

EXAMPLE 2

The materials employed here are the same as in Example 1, except that the blowing agent in the core is VM&P naphtha, which is non-polar. The first heating with non-RF heat will soften the shell, and will heat the naphtha to some extent, but not enough to cause premature volatilization of the naphtha, with consequent danger of rupturing the shell before it is sufficiently soft. The second stage, application of RF energy, will heat the polar core material itself, vaporizing the naphtha blowing agent to cause the desired expansion. The expression VM&P naphtha means varnish makers and painters naphtha, which is a recognized and commercially available grade of naphtha.

EXAMPLE 3

Core material consists essentially of 90% to 98% polystyrene and 2% to 10% water with a water-in-oil emulsifier. The polystyrene is non-polar, but the water is polar. The shell consists essentially of polystyrene. Heat first with non-RF heat to soften the shell. This will also heat the water to some extent, but the shell will soften fast enough to prevent rupture. Then the subsequent RF heat will rapidly vaporize the water to expand the softened shell. Water is a very satisfactory blowing agent, as further mentioned below.

A suitable water-in-oil emulsifier for use in this example, and in all examples where a water-in-oil emulsifier is used, is sorbitan sesquioleate, conveniently available on the market as "Arclacel 83," produced by Atlas Chemical Industries, Inc. But other known water-in-oil emulsifiers may be used if desired.

The following Table I gives in abbreviated form some typical combinations of core, blowing agent, and shell which are advantageously processed by the combination of non-RF and RF heat according to the present invention. Cases 1, 2, and 3 in the table correspond to the foregoing Examples 1, 2, and 3.

TABLE I

| Case | Core | Blowing agent | Shell |
|---|---|---|---|
| 1 | Aluminum isopropoxide and ACP 629 (Polar). | Methylene chloride (Polar) | Polystyrene (Non-polar). |
| 2 | do | VM&P naphtha (Non-polar) | Do. |
| 3 | Polystyrene with water and water-in-oil emulsifier (Non-polar). | Water (Polar) | Do. |
| 4 | 95–99% butadiene styrene elastomer cross linked with 1–5% divinyl benzene (Non-polar). | Methylene Chloride (Polar) | Acrylonitrile-butadiene-styrene terpolymer (Polar). |
| 5 | Polyvinyl chloride and plasticizer (Polar) | Pentane (Non-polar) | Copolymer of styrene and acrylonitrile with copolymer of butadiene and styrene (Polar). |
| 6 | 95–99% chlorostyrene cross linked with 1–5% divinyl benzene, and water-in-oil emulsifier (Polar). | Water (Polar) | Polyvinyl chloride (Polar). |

It will be seen from this table that it is possible to use the two-heat system of the present invention even when both the blowing agent and the shell are polar (as in cases 4 and 6). The heating times and intensity can be adjusted to soften the shell before the blowing agent volatilizes enough to burst it. Much better control is possible with the two kinds of heat, than with one.

The foregoing examples illustrate the broad general principles of the invention. The example and discussions which follow give more specific information on actual techniques which can be employed within the broad framework of the preceding examples.

EXAMPLE 4

A water-in-oil emulsion of water in styrene monomer, containing one percent divinylbenzene on the basis of the styrene monomer and a diazo catalyst is prepared, using a water-in-oil emulsifier, such as "Arlacel 83." The amount of emulsifier may be, for example, from one to ten percent, but amounts between 3–7 percent give superior results. The amount of water incorporated in the water-in-oil emulsion may vary, for example, from one to twenty percent by weight, or more, on the basis of the styrene. The material is suspended in a standard suspension polymerization medium, such as a buffered aqueous casein dispersion, and polymerized in accordance with standard practices. The fully polymerized material may be separated from the suspension mass, washed and air dried. Materials containing high percentages of water (10–20%) may be re-suspended in styrene, and a shell may be formed about the initial material serving as a core. Using lesser amounts of water (1–4%), and omitting the divinyl benzene, the water-in-oil emulsion may be suspension polymerized to yield directly, in a single suspension polymerization process, an expandable polymer, in which water serves as the blowing agent.

Table II indicates the relative efficiency of water as a blowing agent, compared with commercially useful volatile liquid hydrocarbons, as described in my co-pending patent application, Ser. No. 225,829, filed Sept. 24, 1962, now abandoned.

Considering the Dissipation (power) Factor at $10^6$ cycles per second of thermoplastic polymers, as described in the Modern Plastics Encyclopedia, 1964 (Properties Chart) and summarized in Table III in conjunction with the heat sealability table of p. 901 of the 1964 Modern Plastics Encyclopedia, one will readily appreciate the relationship of RF heatability, as a function of the Dissipation Factor.

Those skilled in the art may readily choose suitable combinations of polar and non-polar materials, to suit their individual requirements within the scope of the present invention. Some combinations have been outlined in Table I, but the invention is not limited to the examples cited.

Various techniques may be employed by those skilled in the art to successfully achieve the desired results. Using emulsion polymerization steps, the core material may be prepared initially, added to water in a larger vessel, to which is then added additional monomer and catalysts, without additional emulsifiers, and a shell polymerized about the core material. A second shell may be polymerized about the first shell, by adding additional monomer and catalyst, without additional use of emulsifiers. Using suspension polymerization techniques, the core material is preferentially removed from the suspension material, and dispersed in additional monomer, the combined mass being suspended and polymerized, yielding a shell about the core.

Each shell may contain many fine core particles, which may serve as nucleating agents as well as carriers for the blowing agent. The invention may be used with polymers prepared by solvent polymerization or bulk polymerization, in which gelled blowing agents are dispersed within the polymer.

Polymers produced as noted above are readily modified within the scope of the present invention, to yield a large combination of cores and shells, which serve as useful expandable polymers, being readily processed in accordance with the invention by a combination of non-RF heating and RF heating, applied either simultaneously or in sequence.

The merits of my novel "two-heat" system, are further illustrated by comparison with the use of either RF or non-RF heating alone, in foaming plastics. Using conventional single heat systems which are non-RF in nature, such as hot air, steam, infra red, or conduction heating via heated supporting belts, the shell material must first be heated, and adequate heat must be supplied to vaporize the liquid or solid blowing agent, if foaming is to occur. With inadequate heat, foaming is ineffective, and high density material is produced. With excessive heat, the strength of the fused plastic shell will be low, compared to the vapor pressure of the blowing agent being heated, and bubble bursting will result in the formation of high density material, due to collapsing of the burst bubbles. It is therefore important, when using standard heating techniques, to have a well-balanced formulation, where the physical strength of the plastic being fused balances the vapor pressure of the blowing agent being vaporized, at the temperatures utilized during fusing and foaming operations. This requires a careful choice of the blowing agent and choice of a polymer of suitable molecular weight. Commercially available expandable polystyrene compositions employ as blowing agents volatile liquid hydrocarbons that boil below 100° C., such as pentane, petroleum ether, or methylene chloride, in conjunction with polystyrenes have a molecular weight of approximately 200,000, in order to achieve the necessary balance of properties.

Utilizing RF heat alone, with a polar core and a non-polar shell, it is conceivable that the blowing agent could be heated much more rapidly than the shell material, providing a vapor pressure in excess of the strength of the plastic shell, which will cause shell rupture, and release of blowing agent. This normally undesirable effect can be utilized, if desired, to produce open-celled foams, if carefully controlled.

It is possible to use RF heat alone, in conjunction wi h carefully balanced formulations, wherein the distribution of polarity within the core zone and the shell zone can be carefully controlled, enabling a balance in heating to be realized, so that the shell zone is fused to an expandable state, while the blowing agent is vaporized, causing expansion of the fused shell. However, superior results are achieved through the novel use, according to the invention, of non-RF heating for fusing the shell zone in combination with RF heating for vaporizing the blowing agent in the core zone. The combined heating technique will afford a more economical source of energy than using RF heating exclusively. A broader range of combinations of expandable polymer and volatile liquid blowing agent can be used, to yield desirable low density materials, when employing both heating techniques in a cooperative combination in accordance with the present invention, instead of a single heating system, whether RF or non-RF.

Using non-RF heat to fuse the polymer shell material, followed by RF heating of a polar volatile liquid or solid blowing agent enveloped by the shell, the balance of vapor pressure of the volatile liquid, versus the physical strength of the fused polymer, can be easily and carefully controlled. An additional benefit of this process, is that the blowing agent can be vaporized to a high degree, as the fused polymer passes slowly through its softening range. This relationship of expanding the polymer while it is in a semi-solid state, will provide an effect similar to orientation of thin gauge thermoplastic webbing. It is well known that oriented plastics have superior physical strength to non-oriented material, and expanded polymers, produced by the present "two-heat" system will also have superior properties, in many respects, to those produced by conventional means.

It is within the scope of the invention to use plasticizers, if desired, for either the core material or the shell material or both. Those skilled in the plastics art can readily pick plasticizers suitable for use with any particular core material or shell material, as the use of plasticizers has long been practiced as a means of controlling flowability of polymers, especially in the fused state, and as hot melts and plastisols. Plasticized polyvinyl chlorides and plasticized polystyrene are well known. U.S. Patents 2,253,886 of Britton et al. describes plasticized polystyrenes in some detail. The Plasticizers chart on p. 26 et seq. of the 1964 edition of the Modern Plastics Encyclopedia gives an extensive list of plasticizers. In those aspects or variations of the present invention in which plasticizers are used, the invention is not dependent upon any particular plasticizer, and it is within the skill of the person practicing the present "two heat" invention to pick such plasticizers as he may desire.

Plasticizers may be non-polar, or may be polar in various degrees. While it is difficult to forecast the polar nature of a particular plasticizer, it is found in general that plasticizers having a completley symmetrical structural formula tend to be non-polar, and those which are non-symmetrical tend to be polar, the degree of polarity increasing with the degree of non-symmetry.

As examples of plasticizers useful with the present "two heat" invention, there may be mentioned the following:

(1) A mixture of chlorinated biphenyls and/or polyphenyls, commercially available under the name "Aroclor" from Monsanto Chemical Co. These are polar.

(2) Styrene resins of low molecular weight, which are non-polar, and serve well as plasticizers for styrene. Specific examples are (a) styrene copolymer resin commercially available under the name "Piccotex" from Pennsylvania Industrial Chemical Corp., and (b) thermoplastic styrene polymer commercially available under the name "Piccolastic" from the same source.

These and other plasticizers may be incorporated in the core material, or the shell material, or both, or in either or both of the two shells when a double shell construction is used, and may be used in the two step suspension polymerization process as well as the other processes herein mentioned. The availability of choice of polar or non-polar plasticizers increase the number of possible variations of expanded polymers that can be produced according to the teaching of the present invention.

Use of a non-polar plasticizer in the shell will lower the softening temperature of the polymer, and will lower the temperature at which the vapor pressure of the blowing agent will balance the physical strength of the fused polymer shell. In effect, the expandable material will expand at a lower temperature. Of greater significance, the fusibility of the polymer particles in the shell can be attained at a lower temperature, enabling a continuous film or sheet to be produced before the polymer is expanded to any major degree, if desired. With the use of pressure control, as discussed in greater detail in the co-pending patent applications, expansion can be prevented until the polymer is fused to a continuous web, or shaped article, followed by expansion to low density materials.

The use of polar plasticizer in the core will serve to some degree as a processing aid, contributing to the polarity of the core, if used with a normally non-polar core material. This will modify and control the amount of thermal energy absorbed from a source of RF energy, during expansion of the fused polymer to low density material.

In a variation of above Example 3, a polar plasticizer may be incorporated in the core, and a non-polar plasticizer in the shell. This produces a material which fuses and expands more readily. Aroclor plasticizers may be utilized in the amount of 10–60% of the styrene in the core material, and low molecular weight styrene resins may be incorporated as plasticizers in the shell material, in amounts between 10–60% of the styrene being polymerized by the two step suspension technique, described above.

Another means of incorporating polarity into the core material of expandable polymers, according to this invention, is to utilize polyvinyl chloride (PVC) resins as a "carrier" for the volatile liquid or solid blowing agent. Conventionally, plasticized PVC resins are produced by blending the plasticizer system, which may contain two or more liquids, with the dry powder, at temperatures below the fusion point of the polymer. For fluidized bed use, the final product must be a free flowing powder. Pigments, colorants, antioxidents, etc., are generally incorporated during the blending operation, and may in many cases be included without departing from this invention.

As a core material, part of the liquid plasticizer in a plasticized PVC formulation may be replaced by a volatile liquid blowing agent. Volatile liquid organic materials boiling below 200° C. which only swell the PVC or are non-solvents for the PVC, at polymerization temperatures, serve as useful blowing agents. 40 to 70% of the plasticizer may be replaced with the blowing agent, the plasticizer itself forming 30 to 60% by weight of the PVC formulation. In this manner, the blowing agent will be present as 12 to 42% of the PVC formulation.

For illustrative purposes, the following formulation and procedures are cited, but the invention is not limited to the examples noted. Reference is made to pp. 152–157 of Industrial Solvents by Ibert Mellan, published in 1950 by Reinhold Publishing Corp., for an extensive list of volatile liquids which may be utilized according to this invention.

A preplasticized free flowing powder is first made by conventional dry blending techniques, using a ribbon blender, at temperatures below the boiling point of the blowing agent. The solution of plasticizers and blowing agent is added to the warm PVC powder and blended until the liquid is absorbed into the PVC powder. This free flowing powder is dispersed in styrene, containing an organic catalyst and a minor amount of a cross linking material, such as divinyl benzene, and the material is suspended in a buffered aqueous dispersion of casein, and polymerized by standard procedures, to form a core material. The polymerized core material is separated from the aqueous media, redispersed in styrene, containing an organic catalyst system, and the combined mass resuspended in an aqueous casein suspension media, wherein the styrene is polymerized about the core material. The core material should be present in the final material in the range of 10–30% by volume, and sufficient volatile blowing agent should be present in the core material, to provide 4–7% of volatile liquid blowing agent, on the basis of the total polymer particle.

Instead of liquid a decomposable solid chemical blowing agent may be used, for example being dispersed in a plasticizer which is used in the core material. Calcium citrate and gypsum provide useful blowing agents when incorporated into a core formulation, by virtue of the water of hydration associated with the material, in solid form. These solids may be incorporated in the plasticizer as described above, as well as in a dispersed form within the water in oil emulsion described as Example 3 above. The water of hydration may serve as the sole or major source of water in the core, if desired, in preparing cores wherein water is a polar blowing agent, as practiced in this invention.

When using plasticized PVC as core materials, in which a liquid blowing agent is incorporated in the plasticizer, water in oil emulsions of water in the plasticizer may serve as a useful means of incorporating water into the core zone, as described above.

Water in oil emulsions of water in plasticizers, which are incorporated into PVC to form free flowing powders, as described above, and practiced in industry, may be utilized directly as foamable powders, in addition to being used as core material, as practiced in two-step heating techniques, according to the embodiments of this and my co-pending applications.

While the invention has been described with reference to particular embodiments thereof, it will be understood that in its broadest aspects, the invention may be varied within the scope of the invention as set forth therein, and in the appended claims.

Table I, referred to in the foregoing description, has been given above. Tables II, III, and IV are as follows:

TABLE IV.—THERMOSETTING PROPERTIES CHART
(Modern Plastics Encyclopedia, 1964)

| | Dissipation @ $10^6$ cycles |
|---|---|
| Casein | .052 |
| DAP (mineral filled) | .01–.06 |
| Furan | None |
| Melamine-Formaldehyde: | |
|     No filler | None |
|     Asbestos filler | .04–.05 |
| Phenol-Formaldehyde: | |
|     No filler | .015–.03 |
|     Asbestos filler | .4–.8 |
|     Pulp preformed and molding board | .03–.7 |
| Compounded with butadiene-acrylonitrile copolymer asbestos filler | .010–.015 |
| Polyacrylic | None |
| Polyester and Alkyds: | |
|     Preformed chopped roving | .01–.03 |
|     Premix | .008–.022 |
| Silicone: | |
|     Glass filled | .002–.02 |
|     Mineral filled | .002–.005 |
| Urea-Formalde, alpha cellulose fiber | .25–.35 |
| Allyl cast | .028–.06 |
| Epoxy cast: | |
|     No filler | .03–.05 |
|     Silica filler | .02–.04 |
| Flexible epoxy (poly-sulfide epoxy) | .018–.090 |
| Phenolic cast: | |
|     No filler | .04–.05 |
|     Mineral filler | .07–.20 |
| Polyester cast: | |
|     Rigid | .006–.026 |
|     Flexible | .023–.06 |

TABLE II

| Material | A Boiling Point, °C. | B Molecular Weight | C Gms./Litre at STP | D Volume/Gm. Gas 0° C. | E Volume/Gm. Gas 100° C. | F Specific Gravity | G Liquid, cc./gm. | H Volume Expansion Ratio at 100° C. |
|---|---|---|---|---|---|---|---|---|
| Acetone | 56.1 | 58.1 | 2.59 | 386 | 529 | .788 | 1.27 | 417 |
| Cyclopentadiene | 42.5 | 66.1 | 2.94 | 340 | 465 | .751 | 1.33 | 345 |
| Cyclopentane | 49.5 | 70.1 | 3.12 | 320 | 438 | .805 | 1.24 | 363 |
| Ethanol | 78.3 | 46.1 | 2.05 | 487 | 657 | .785 | 1.275 | 515 |
| Ethyl Acetate | 77.2 | 88.1 | 3.93 | 254 | 348 | .895 | 1.118 | 311 |
| Ethylene chloride | 83.7 | 98.9 | 4.42 | 226 | 310 | 1.245 | .803 | 386 |
| Ethyl ether | 34.5 | 74.1 | 3.30 | 303 | 415 | .707 | 1.414 | 294 |
| Ethyl formate | 53.8 | 74.1 | 4.46 | 303 | 415 | .924 | 1.08 | 384 |
| Heptane | 98.4 | 100.2 | 3.84 | 224 | 307 | .679 | 1.47 | 209 |
| Hexane | 68.7 | 86.2 | 1.43 | 260 | 356 | .655 | 1.52 | 234 |
| Methanol | 64.5 | 32.0 | 3.30 | 700 | 958 | .786 | 1.275 | 750 |
| Methyl Acetate | 57.2 | 74.1 | 3.78 | 303 | 415 | .927 | 1.078 | 385 |
| Methylene Chloride | 40.6 | 84.9 | 1.40 | 264 | 362 | 1.336 | .748 | 483 |
| Methyl formate | 60.1 | 31.5 | 3.22 | 715 | 980 | .967 | 1.035 | 945 |
| Pentane | 36.0 | 72.2 | 2.59 | 310 | 425 | .62 | 1.61 | 264 |
| Propionaldehyde | 48.8 | 58.1 | 0.805 | 386 | 528 | .806 | 1.24 | 426 |
| Water | 100.0 | 18.0 | | 1,240 | 1,700 | 1.00 | 1.00 | 1,700 |

Column B = Molecular Weight.
Column C = B/22.4 (22.4 litres at 760 mm. pressure at 0° C. contain 1 Gram Molecular Weight).
Column D = 1,000/C.
Column E = 373/273×D.
Column G = 1/F.
Column H = E/G.

TABLE III.—THERMOPLASTICS
[Modern Plastics Encyclopedia, 1964; Sealability Rating, page 901]

| Material | Remark | Dissipation (power) Factor $10^6$ cycles ASTM (D 150) |
|---|---|---|
| Acetal | | 0.004 |
| Acrylic: | | |
|   M M | | .02 |
|   M M/Styrene Copolymer | | .019 |
|   Impact | | .01–.02 |
| Cellulose: | | |
|   Ethyl Cellulose | Excellent | .01–.06 |
|   Cellulose Acetate | do | .05–.10 |
|   Cellulose Acetate Butyrate | do | .02 |
|   Cellusloe Nitrate (Pyroxylin) | | .03 |
| Chlorinated Polyether | | .01 |
| Nylon | Excellent | .03–.00 |
| Polyethylene: | | |
|   High | No effect | .0003 |
|   Medium | do | .0003 |
|   Low | do | .0003 |
|   Ethylene-Ethyl Acetate Copolymer | | .01–.02 |
| Polypropylene | | .0001–.0005 |
| Polychloro-trifluoro-ethylene | | .0036–.017 |
| Polytetra-fluoro-ethylene | | .0002 |
| FEP Fluorocarbon | No effect | .0003 |
| Polystyrene: | | |
|   Unfilled | do | .0001–.0004 |
|   Styrene Acrylonitrile Copolymer | | .007–.010 |
|   ABS Terpolymer and Blends | Excellent | .007–.026 |
| Polycarbonate | | .010 |
| Phenoxy | | .03 |
| Vinyl: | | |
|   Vinyl Butyral | | .061 |
|   Vinyl Chloride and Vinyl Chloride-Acetate | Good | (¹) |
|   Vinylidene Chloride | | .05–.08 |
|   Vinyl Formal | Excellent | .023 |
|   Polyvinyl Dichloride | | .02 |
|   Polyvinylidene Fluoride | | .17 |
| Urethane | Good | .01–.05 |

¹ Rigid .006–.019; Flexible .04–.14.

What is claimed is:

1. The method of producing a foamed plastic mass from a mass of particles substantially each of which has a core portion comprising gelled-non-polar blowing agent material which, when heated above a predetermined temperature forms a gas, and a thermoplastic resin shell portion enveloping said core portion, said shell portion being substantially more responsive than said core portion to RF heat, which comprises: applying RF heat to said particles until substantially all of the shell portions thereof have sufficient softness to expand without rupturing; and, while said shell portions are substantially at said softness, applying sufficient non-RF heat to said particles to volatilize the blowing agent and to expand said particles.

2. The method according to claim 1, wherein the application of said RF heat is sufficient to cause substantially all of said particles in said mass to fuse together.

References Cited

UNITED STATES PATENTS

| | | | |
|---|---|---|---|
| 3,138,478 | 6/1964 | Hedman et al. | 117—100 X |
| 3,223,518 | 12/1965 | Hansen | 117—100 |
| 3,253,064 | 5/1966 | Buonaiuto | 264—53 X |
| 2,354,260 | 7/1944 | Haney et al. | 264—53 |
| 2,962,456 | 11/1960 | Carlson | 260—2.5 |
| 2,983,692 | 5/1961 | D'Alelio | 260—2.5 |
| 2,989,782 | 6/1961 | Barkhuff et al. | 117—100 X |
| 3,010,157 | 11/1961 | Cizek | 219—10.4 X |
| 3,057,751 | 10/1962 | Nagle | 117—100 |
| 3,086,885 | 4/1963 | Jahn | 117—100 |
| 3,154,604 | 10/1964 | McMillan | 117—100 X |

WILLIAM D. MARTIN, *Primary Examiner.*

R. HUSACK, *Assistant Examiner.*